Patented May 13, 1924.

1,493,996

UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS FOR PRODUCING HYDROCYANIC ACID AND ALKALI-METAL NITRATES.

No Drawing.  Application filed November 24, 1922. Serial No. 603,121.

*To all whom it may concern:*

Be it known that I, OTTO LIEBKNECHT, a citizen of the Republic of Germany, and resident of Frankfort-on-the-Main, Germany, have invented a certain new and useful Process for Producing Hydrocyanic Acid and Alkali-Metal Nitrates, of which the following is a specification.

Sulphuric acid which is known to cause no decomposition of hydrocyanic acid has been practically exclusively used up to the present time for the preparation of hydrocyanic acid from cyanides or mixtures of salts containing cyanides.

On investigating the reaction between nitric acid and cyanides or mixtures with salts containing cyanides I have discovered that nitric acid does not cause decomposition of hydrocyanic acid. Since we have here a powerful oxidizing agent such as nitric acid reacting on a strong reducing agent such as cyanide, it is surprising that neither the hydrocyanic acid nor the nitric acid is decomposed. This is especially true when one considers the action of nitric acid on mixtures of salts containing cyanides such as are obtained by fusion of calcium cyanamid with alkali metal chlorides. Even here in spite of the presence of hydrochloric acid which is known to liberate chlorine when treated with nitric acid, no decomposition of either hydrocyanic acid or nitric acid results.

This process may be illustrated by allowing nitric acid to flow into a solution or suspension of cyanides or salts containing cyanides with simultaneous heating of the nitric acid. The use of a very small excess of nitric acid is sufficient for the quantitative formation of hydrocyanic acid.

In contrast to the well known process using sulphuric acid this method has a great advantage since valuable by-products such as salt-peter or mixtures containing it are obtained. Since nitric acid in order to be made useful as a fertilizer must first be combined with bases, it will be seen that by using nitric acid in this process the bases present in the cyanides are not only not rendered worthless as is the case when cyanides are treated with sulphuric acid but are changed into valuable products, and the nitric acid serves a double purpose of producing both fertilizers and hydrocyanic acid.

When mixtures of salts such as those obtained by fusion of calcium cyanamid with alkali metal chlorides are used according to my process, solutions are obtained after the expulsion of the hydrocyanic acid which contain in addition to alkali metal nitrates, nitrate of calcium, alkali metal chloride, and calcium chloride. These solutions may be advantageously turned over into valuable products if treated with alkali metal solutions capable of forming insoluble or slightly soluble compounds, for example, addition of sodium sulfate precipitates calcium sulfate. Solutions are thus obtained which contain only alkali metal nitrate and alkali metal chloride and may therefore be used satisfactorily as fertilizers. The salts in these solutions may be obtained as solids in any known manner.

What I claim is:

1. A process of producing hydrocyanic acid by treating cyanides with nitric acid.

2. A process of producing hydrocyanic acid by treating salts containing cyanides with nitric acid.

3. The process of preparing HCN and alkali metal nitrates by treating cyanide material containing alkali and alkali earth metals with nitric acid to obtain the HCN and removing the alkali earth metals from solution by adding alkali metal salts, the acids of which form with the alkali earth metals substantially insoluble compounds.

In testimony whereof I have signed my name to this specification in the presence of two subscribing witnesses.

OTTO LIEBKNECHT.

Witnesses:
 C. C. L. B. WYLES,
 BASIL E. SAVARD.